C. VAN DER LEUN.
LOCK.
APPLICATION FILED MAR. 6, 1919.

1,342,075.

Patented June 1, 1920.

Inventor,
Cornelis van der Leun,
By Rummler & Rummler
Attys.

UNITED STATES PATENT OFFICE.

CORNELIS van der LEUN, OF THE HAGUE, NETHERLANDS.

LOCK.

1,342,075.     Specification of Letters Patent.     Patented June 1, 1920.

Application filed March 6, 1919. Serial No. 280,994.

*To all whom it may concern:*

Be it known that I, CORNELIS VAN DER LEUN, private man, a subject of the Queen of the Netherlands, residing at The Hague, the Netherlands, 45 Columbusstraat, have invented certain new and useful Improvements in Locks, of which the following is a specification.

This invention relates to locks and has for its object the provision of a simple, inexpensive, and reliable safety device which is quickly and easily manipulated by one who knows the combination, but which can not be manipulated by an unauthorized person.

In general, the invention comprises locking means in the nature of one or more balls, rolls, cylinders, or the like, shiftable from one to the other of two compartments or pockets so as to prevent or allow relative movement of two members, the movement of said locking means from one to the other of said pockets being controlled by a number of superimposed relatively shiftable plates.

An illustrative embodiment of the invention is shown in the accompanying drawings, in which—

Figure 1:
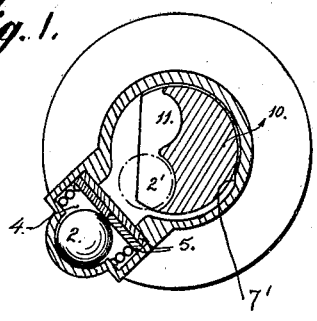
Figure 1 is a transverse sectional detail showing the locking means in position to permit the relative movement of the two parts.

In the aforesaid figures, the device is shown as particularly applicable to a bicycle hub. However, it will be understood that this is merely illustrative of the invention and that it is equally suitable for use on other devices and for other purposes.

The construction as illustrated comprises a pair of relatively movable members or parts 7 and 8 provided with pockets 11 and 4 respectively, connected by a suitable passage and between which the ball 2 is movable either for securing the two members against relative rotation, or releasing them so as to permit said relative rotation.

In the specific embodiment, the part 8 is in the nature of an axle, and the part 7 a hub rotatably supported on said axle. The axle 8 is provided with an enlargement 10 in which two pockets 11 are formed for the purpose of providing a seat for the ball 2 when the two parts are to be secured against relative rotation.

The hub 7 has an axially disposed offset part in which the pocket 4 is formed and between which and the enlargement 10 the plates 5 are slidably mounted. The plates 5 are herein shown to be three in number, the under one of which is provided with an aperture near one end thereof so arranged that it is adapted to be moved into and out of position to register with the passage connecting the pockets 4 and 11. The two upper plates are each half as wide as the lower plate and are slidably mounted upon said lower plate in the same plane with each other. Said upper plates are each provided with a semi-circular recess in the abutting edges, which recesses are normally in staggered relation. These two upper plates are independently shiftable so as to bring the semi-circular recesses into registration with each other and with the aperture in the lowermost plate and the passage connecting the pockets 4 and 11. Suitable graduations are formed on the ends of the plates 5, which serve as a guide in properly setting the plates to connect the pockets 4 and 11 for permitting the ball 2 to pass from one to the other.

A coiled spring 12 is concentrically arranged in the pocket 4 so as to bear upon the uppermost plates 5 and hold them firmly against the lowermost plate and the lowermost plate against the member 7, the pressure of the spring exceeding the weight of the ball 2 so as to render it impossible for one to find out how to adjust the plates merely by feeling the weight of the ball.

Figure 2:
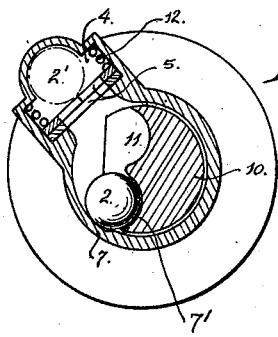
Fig. 2 is a similar view showing the locking means in position to secure said two parts against relative movement.
Figure 3:
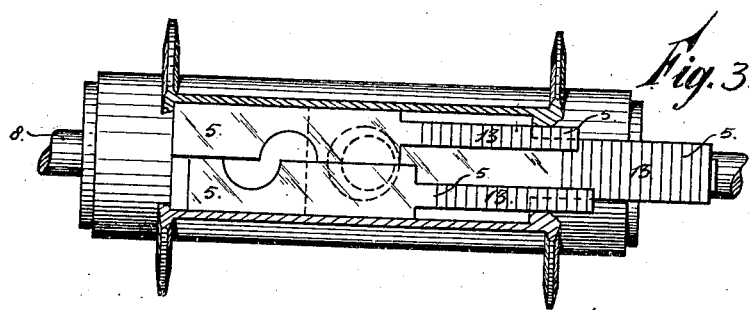
Fig. 3 is a side view, partly sectional, of the same.
Figure 4:
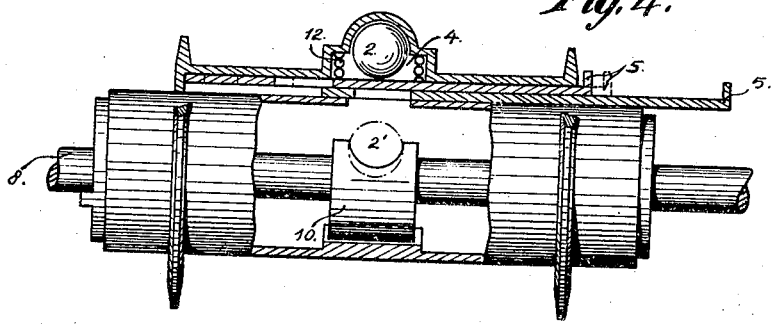
Fig. 4 is a side elevation, also partly sectional, of the same.

The member 7 has a recess formed in the inner periphery thereof at one side of the passage connecting the two pockets 4 and 11 as is clearly shown in Figs. 1 and 2. This forms a shoulder 7' which serves to obtain a locking action of the ball when it is in one of the pockets 11.

Although but one specific embodiment of this invention has been herein shown and described, it will be understood that some details of the construction shown may be altered or omitted without departing from the spirit of this invention as defined by the following claims.

I claim:

1. A lock of the class described, comprising a pair of relatively movable members, each of which has a pocket formed therein, which pockets are connected by a passage, locking means movable from one to the other of said pockets, a shoulder on one of said members adapted to coact with said locking means when seated in the pocket of said one member so as to secure both of said members against relative movement, a plate shiftably mounted on the other of said members and having an aperture therein adapted to be moved into and out of registration with said passage, and a pair of plates shiftably mounted in the same plane with each other upon said first-mentioned plate, and each having a recess formed in the edge thereof, said pairs of plates being independently movable for bringing said recesses into and out of registration with each other and with said passage so as to coact with the aperture in said first-mentioned plate for controlling the passage of said locking means from one of said pockets to the other.

2. A lock of the class described, comprising a pair of relatively movable members, each of which has a pocket formed therein, which pockets are connected by a passage, locking means movable from one to the other of said pockets, a shoulder on one of said members adapted to coact with said locking means when seated in the pocket of said one member so as to secure both of said members against relative movement, a plate shiftably mounted on the other of said members and having an aperture therein adjacent to one end thereof and adapted to be moved into and out of registration with said passage, and a pair of plates shiftably mounted in the same plane with each other upon said first-mentioned plate, and each having a recess formed in the opposed edges thereof in normally staggered relation, said pairs of plates being independently movable for bringing said recesses into and out of registration with each other and with said passage so as to coact with the aperture in said first-mentioned plate for controlling the passage of said locking means from one of said pockets to the other.

3. A lock of the class described, comprising a shaft, a hollow cylindrical-shaped member rotatably mounted on said shaft, said shaft and member having pockets formed therein and connected by a passage, a ball movable from one of said pockets to the other, a shoulder on said cylindrical member adapted to coact with said ball when seated in the pocket in said shaft for securing said cylindrical member and shaft against relative rotation, a plate slidable upon said cylindrical member in an axial direction and having an aperture located near one end thereof adapted to be moved into and out of registration with said passage, and a pair of plates shiftably mounted in the same plane upon said first-mentioned plate and each having semi-circular recesses formed in the opposed edges thereof in normally staggered relation, said pair of plates being independently shiftable for bringing said recesses into registration with each other and with said passage so as to coact with the aperture in said first-mentioned plate for controlling the passage of said ball from one of said pockets to the other.

4. A lock of the class described, comprising a pair of relatively movable members, each of which has a pocket formed therein, which pockets are connected by a passage, locking means movable from one to the other of said pockets, a shoulder on one of said members adapted to coact with said locking means when seated in the pocket of said one member so as to secure both of said members against relative movement, a plate shiftably mounted on the other of said members and having an aperture therein adapted to be moved into and out of registration with said passage, a pair of plates shiftably mounted in the same plane with each other upon said first-mentioned plate, and each having a recess formed in the edge thereof, said pairs of plates being independently movable for bringing said recesses into and out of registration with each other and with said passage so as to coact with the aperture in said first-mentioned plate for controlling the passage of said locking means from one of said pockets to the other, and resilient means normally urging said pair of plates against said first-mentioned plate and against said one member substantially as and for the purpose specified.

5. A lock of the class described, comprising a shaft, a hollow cylindrical-shaped member rotatably mounted on said shaft, said shaft and member having pockets formed therein and connected by a passage, a ball movable from one of said pockets to the other, a shoulder on said cylindrical member adapted to coact with said ball when seated in the pocket in said shaft for securing said cylindrical member and shaft against relative rotation, a plate slidable upon said cylindrical member in an axial direction and having an aperture located near one end thereof adapted to be moved into and out of registration with said passage, a pair of plates shiftably mounted in the same plane upon said first-mentioned plate and each having semi-circular recesses formed in the opposed edges thereof in normally staggered relation, said pair of plates being independently shiftable for bringing said recesses into registration with each other and with said passage so as to coact with the aperture in said first-mentioned plate for controlling the passage of said ball from one of said pockets to the other, and a spring interposed between said pair of plates and said cylindrical member concentrically with said passage and normally urging said pair of plates against said one plate and against said member, substantially as and for the purpose specified.

In testimony whereof I affix my signature.

CORNELIS van der LEUN.